Jan. 17, 1961     J. T. SMITH     2,968,799
MAGNETIC TRANSDUCER

Filed Oct. 24, 1957     2 Sheets-Sheet 1

INVENTOR.
JAMES T. SMITH
BY
ATTORNEY

Jan. 17, 1961    J. T. SMITH    2,968,799
MAGNETIC TRANSDUCER
Filed Oct. 24, 1957    2 Sheets-Sheet 2

United States Patent Office 2,968,799
Patented Jan. 17, 1961

---

2,968,799

MAGNETIC TRANSDUCER

James T. Smith, San Jose, Calif., assignor to International Business Machines Corporation, New York, N.Y., a corporation of New York Filed Oct. 24, 1957, Ser. No. 692,123

9 Claims. (Cl. 340—174.1)

The present invention pertains generally to transducers and relates more particularly to transducers for sensing magnetically recorded data.

When a semiconductor is placed in a magnetic field and is illuminated in a direction perpendicular to the field, a voltage is developed across the semiconductor in a direction mutually perpendicular to both the light and the field. This is known as the photo-magneto-electric (PME) effect in semiconductors, which effect is described in pages 167 through 194 of a book entitled "Progress in Semiconductors," Vol. I, published by John Wiley & Sons, Inc., in 1956. The transducers disclosed herein utilize the PME effect for sensing magnetically recorded data.

According to one embodiment of the invention arranged for detecting the horizontal component of a magnetic field, the magnetically recorded data is scanned by a light beam. The resolution of the transducer is thus governed by the width of the light beam. Since the image of a slit of light may be made extremely small, a transducer with a very high resolution is obtainable. In another embodiment of the invention arranged for detecting the vertical component of magnetic fields, the resolution is determined by the thickness of the semiconductor. Since a few microns of pure semiconductor, such as germanium, may be vapor-plated onto a surface, such as glass, it is also possible to obtain a very high resolution transducer by this method.

An object of the invention is to provide a new and improved magnetic transducer.

Another object is to provide a PME transducer for sensing magnetically recorded data.

A further object is to provide a transducer effective for scanning magnetically recorded data optically.

Still another object is to provide a high resolution magnetic transducer wherein the resolution is determined by the width of a slit of light utilized for scanning the recorded data.

A still further object is to provide a transducer for sensing magnetically recorded data and having a resolution defined by the thickness of a semiconductor material.

The transducers of the invention will be understood to be devices which generate signals in response to magnetically recorded data only if a magnetic field and light are present simultaneously. Thus, they are adapted for control by optical switching devices arranged to determine the light to which the transducer is subjected.

Another object of the invention, therefore, is to provide a light-sensitive magnetic transducer.

Still another object is to provide a magnetic transducer wherein both scanning and control operations are determined according to the exposure of the transducer to light.

Other objects of the invention will be pointed out in the following description and claims and illustrated in the accompanying drawings which disclose, by way of example, the principle of the invention and the best mode which has been contemplated of applying that principle.

Figure 1:
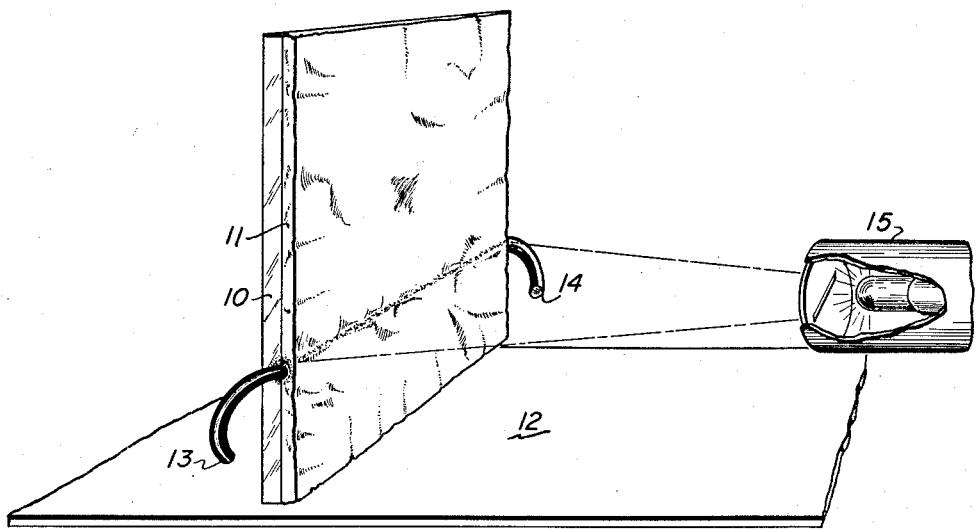
Fig. 1 is a perspective view of one embodiment of the invention adapted for sensing the vertical component of a magnetic field.

Referring now to Fig. 1, the embodiment there shown comprises a supporting member 10 upon which is affixed a thin layer of suitable semiconductor material 11, such as germanium. The member 10 is disposed perpendicularly to a recording surface 12 of suitable magnetic material for cooperating therewith in a manner to be described. Affixed to either side of the semiconductor layer 11 are conductors 13 and 14 from which PME signals are taken when magnetic fields are sensed.

The transducer shown in Fig. 1 is arranged for sensing the vertical component of a magnetic field emanating from the surface 12, and for this reason it is illuminated by means of a lamp 15 disposed at right angles to the plane of the surface of the transducer as shown. It is not necessary that the beam from the lamp 15 extend completely between the conductors 13 and 14; however, it is desirable since the PME voltage is small and since the resistance of the semiconductor 11 between conductors 13 and 14 is analogous to the internal resistance of a battery. Since the semiconductors suitable for this use are also photoconductors, the minimum internal resistance is obtained by illuminating the area thereof which extends between the conductors 13 and 14.

As mentioned above, when a semiconductor is placed in a magnetic field and is illuminated in a direction perpendicular to the field, the PME effect develops a voltage in a direction mutually perpendicular to both the field and the light. Photo electrons and the resulting positive holes generated near the surface of the semiconductor set up a concentration gradient and diffuse down through the specimen. Under the influence of a transverse magnetic field these two types of carriers (electrons and positive holes) are deflected in opposite directions. This motion of the carriers at right angles to the light and to the field produces an effective PME voltage across the conductors 13 and 14. Thus, when the semiconductor 11 is illuminated by the lamp 15 and when a magnetic field emanating from the recording surface 12 is disposed adjacent the semiconductor 11, the vertical component of the field causes the PME voltage to appear across the conductors 13 and 14. This voltage varies according to the field strength and it is by this means, therefore, that the transducer senses the recorded data.

It is to be noted that the resolution of the transducer shown in Fig. 1 is determined by the thickness of the semiconductor 11. This thickness may be made very small. For example, a few microns of a pure semiconductor, such as germanium, can be vapor-plated onto a surface of glass to yield a transducer with the desired high resolution. Fortunately, it has been found that the thinner the semiconductor layer the higher is the PME voltage, as shown by the following equation, although one would not expect this to extend to atomic distances.

$$V_{PME} = \left(\frac{2\alpha}{1+2\alpha}\right)\left(\frac{BdLI}{tn_0}\right)(1+[b\mu B^2])^{-1}$$

where:

$B$ = magnetic field
$d$ = distance between electrodes used in measuring the voltage
$L$ = range for holes
$I$ = incident light in Quanta/cm.$^2$ sec.
$t$ = thickness of slab
$2n_0$ = number of carriers per unit volume present in thermal equilibrium $$\alpha = \frac{D}{LS}$$

Figure 2:
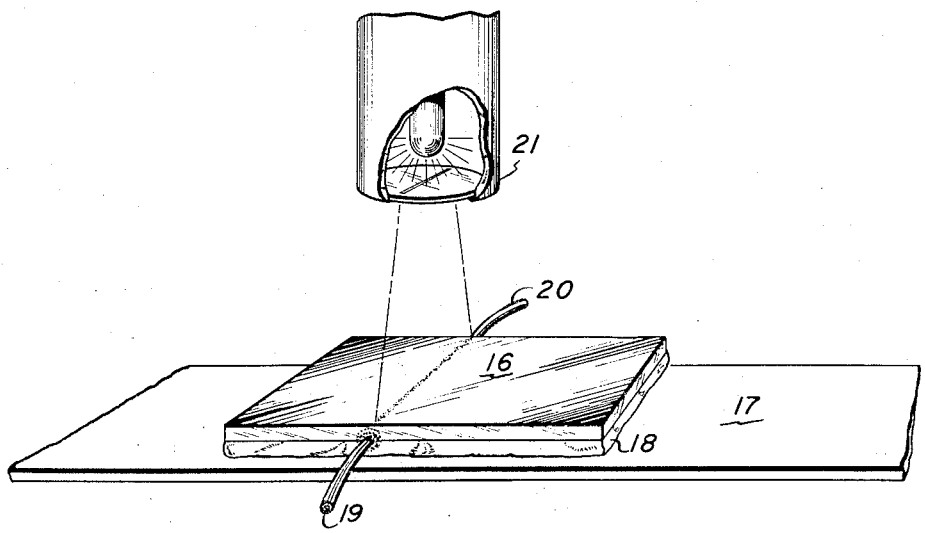
Fig. 2 is a perspective view of another embodiment of the invention adapted for sensing the horizontal component of a magnetic field.

$D$ = thermal diffusion coefficient for holes
$\mu$ = mobility for holes
$S$ = surface recombination velocity
$b$ = mobility ratio Referring now to Fig. 2, the embodiment of the invention there shown comprises a transparent support member 16 disposed opposite a suitable recording surface 17. A thin layer 18 of semiconductor material is affixed to the member 16 between it and the recording surface 17. Conductors 19 and 20 are connected across the semiconductor layer 18 for connecting the PME signal for use as is desired. A lamp 21 is provided for illuminating the semiconductor in a direction perpendicularly thereof, suitable optical means (not shown) being provided where necessary for determining the dimensions of the light beam striking the semiconductor.

As mentioned earlier herein, the transducer shown in Fig. 2 is adapted to sense the horizontal component of magnetic fields emanating from the recording surface 17. Thus, the horizontal component of the field emanating from portions of the recording surface 17 adjacent the illuminated portions of the semiconductor 18 causes a corresponding PME voltage to appear across the conductors 19 and 20 according thereto. Since this signal appears only if both the light and the magnetic field are present, it will be understood that the resolution of the transducer is determined by the width of the slit of light striking the semiconductor. As is well known in the optical arts, the image of a slit of light may be made extremely small, thereby providing a very high resolution magnetic transducer. Of further interest, it is to be noted that the recording surface 17 may be scanned either by moving it relative to the transducer or by moving the light beam across the transducer. Thus, a transducer stationary relative to the recording surface is provided wherein the condition of the recording surface is determined by scanning the common areas thereof with a light beam.

Figure 3:
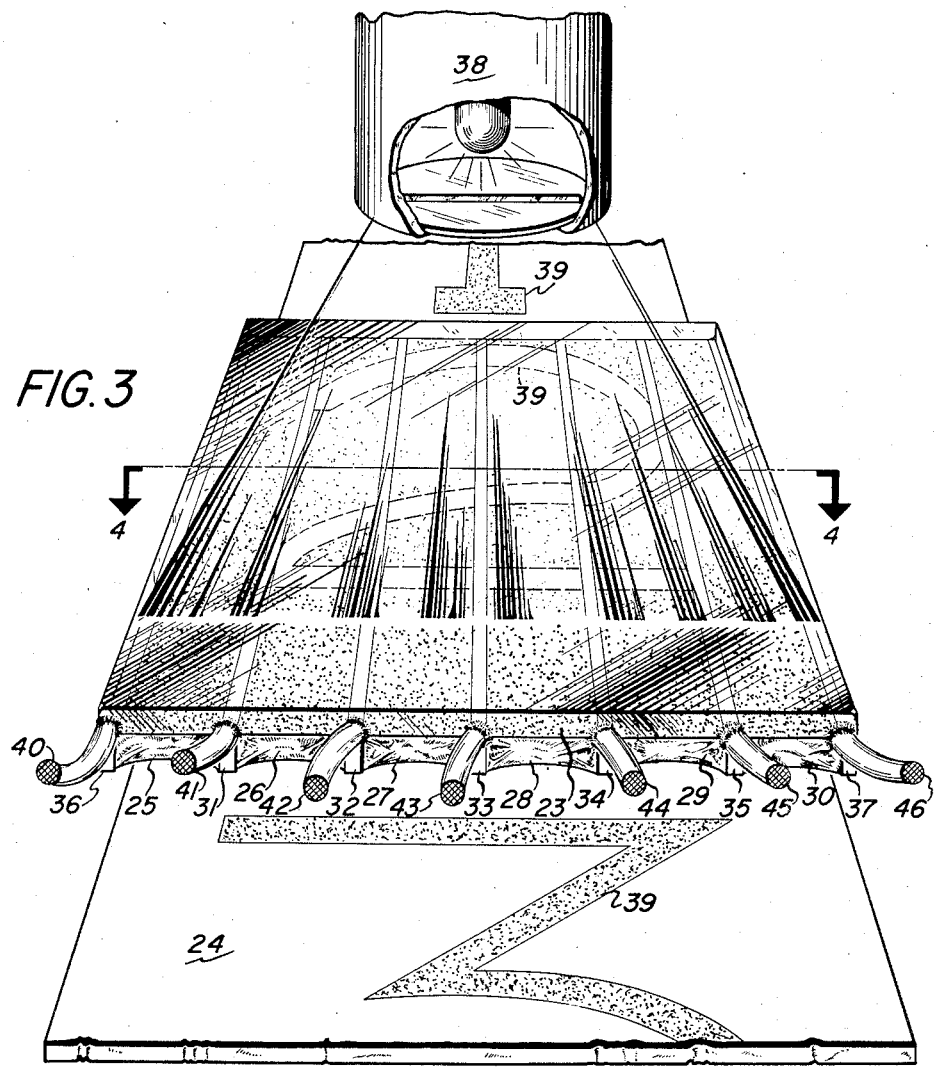
Fig. 3 is a perspective view of a matrix constructed according to the invention and arranged for scanning patterns of magnetically recorded signals.
Figure 4:
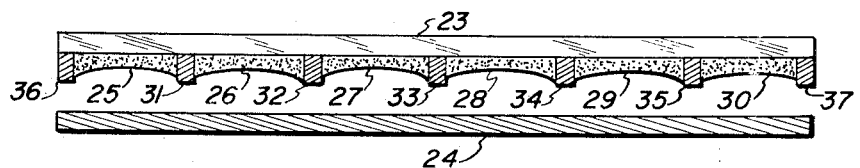
Fig. 4 is a vertical section taken along line 4—4 of Fig. 3.

The principles of the embodiment of the invention shown in Fig. 2 have been extended to provide the matrix-like scanning device shown in Figs. 3 and 4. Referring now to Figs. 3 and 4, a transparent support member 23 is disposed opposite a recording surface 24 for supporting several spaced semiconductor layers 25 through 30 therebetween. The layers 25 through 30 are separated by several conductor strips 31 through 35, conductor strips 36 and 37 being disposed on the outside edges of layers 25 and 30, respectively. Illuminating means 38 are provided for yielding a fine slit of light extending across the layers 25 through 30, any convenient means being utilized for obtaining a slit of light of the desired dimensions.

The disclosed embodiment is shown as adapted for sensing magnetized characters 39 printed with magnetic material on the recording surface 24. The magnetized characters are sensed by moving them relative to the slit of light and, when the character is scanned in this manner, PME voltages are developed across the layers 25 through 30 according to those portions of the character disposed therebeneath. The width of the character is thus divided into several vertical channels according to the spacing of the conductor strips 31 through 37, each of these channels being scanned from one end to the other by the light slit. It will be seen that either the printed character or the slit of light may be moved to provide the necessary scan. The PME signals developed across the various layers 25 through 30 are connected via conductors 40 through 46 to suitable decoding circuitry (not shown). These signals correspond to the magnetization of the material disposed adjacent the light slit, and this information, together with the occurrence in time thereof (determined by the rate of scan and by the identity of the character), is sufficient to determine the character being scanned when suitable circuitry well known in the character sensing art is utilized for decoding purposes to determine the character identity.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A transducer for generating signals in response to magnetic fields emanating from a magnetic recording surface comprising a semiconductor surface disposed adjacent and parallel to said recording surface, means for illuminating said semiconductor surface with a slit of light disposed at right angles said fields, and means for moving said surface relative to said slit of light for providing a scan of said surface thereby, whereby photomagneticelectric signals appear across said semiconductor according to the magnetization of portions of said surface determined by the dimensions of said slit of light.

2. A transducer for sensing a component of magnetic fields emanating from a magnetic recording surface comprising a semiconductor surface, means for supporting said semiconductor surface adjacent and parallel to said recording surface, means for illuminating said semiconductor surface in a direction substantially perpendicular to said semiconductor surface, and means connected across said semiconductor surface in a direction mutually perpendicular to both said component of magnetic fields and the direction of said illuminating means for indicating photomagneticelectric signals representative of said component of the magnetization of portions of said recording surface defined by said illuminating means.

3. A magnetic transducer matrix for sensing magnetic fields emanating from a magnetic recording surface comprising a plurality of spaced semiconductor strips, means for supporting said strips opposite said surface, scanning means for providing a narrow slit of light transversely of said strips, and means cooperating with each of said strips for indicating photomagneticelectric signals developed thereacross according to the magnetization of the portions of the said surface disposed opposite the illuminated portions of said strips.

4. A transducer matrix for sensing magnetic fields emanating from selected portions of a magnetic recording surface comprising a semiconductor surface, means for supporting said semiconductor surface opposite said recording surface and parallel thereto for subjecting said semiconductor surface to said magnetic fields, means for illuminating portions of said semiconductor surface disposed opposite said selected portions of said recording surface, and means cooperating with said semiconductor surface for photomagneticelectric indicating signals generated according to the magnetization of said selected portions defined by said illuminating means.

5. A transducer matrix for sensing magnetic fields emanating from selected portions of a magnetic record comprising a plurality of semiconductor layers, means for supporting said layers opposite said record and parallel thereto for subjecting them to said magnetic fields, means for selectively illuminating said layers, and means for indicating the photomagneticelectric signals developed across said layers which indicate the magnetization of portions of said record opposite illuminated portions of said layers.

6. A transducer matrix for sensing magnetic fields emanating from selected portions of a magnetic record comprising a plurality of semiconductor layers disposed in a common plane, said common plane being arranged closely adjacent and parallel to said record for subjecting it to said magnetic fields, means for selectively illuminating portions of said common plane, and means for indicating the photomagneticelectric signals developed across each of the various layers which indicate the magnetization of portions of said record opposite illuminated portions of said layers.

7. A transducer matrix for sensing magnetic fields emanating from selected portions of a magnetic record comprising a transducer surface disposed opposite said record for subjection to said fields, said surface including a plurality of spaced conductors and semiconductor material disposed therebetween, and means for selectively illuminating portions of said semiconductor material for causing photomagneticelectric signals representative of said fields opposite said illuminated portions to appear across selected pairs of said conductors.

8. A transducer matrix for sensing magnetic fields emanating from selected portions of a magnetic record comprising a plurality of spaced conductors supported in parallel relationship to said record by a member disposed opposite said record, semiconductor material disposed intermediately of said conductors for cooperating with said fields, and illuminating means for providing a slit of light on said semiconductor material transversely of said conductors for causing said light, semiconductor and record to coact to cause photomagneticelectric signals to appear across pairs of said conductors according to the magnetic fields emanating from corresponding portions of said record disposed opposite illuminated portions of said semiconductor material.

9. A transducer matrix for sensing magnetic fields emanating from selected portions of a magnetic record comprising a transparent support member disposed opposite said record, a plurality of spaced conductors supported by said member intermediately of said record and said member, a plurality of strips of semiconductor material, said strips being disposed intermediately of corresponding conductors and being arranged for subjection to said fields, means for directing a slit of light on said member transversely of said conductors for illuminating selected portions of said strips defined thereby, and means for moving said record relative to said slit of light for scanning portions of said record corresponding to said strips and causing photomagneticelectric signals representative of portions of said fields disposed opposite illuminated portions of said strips to appear across conductors disposed on either side of the corresponding strips.

References Cited in the file of this patent

UNITED STATES PATENTS

| | | |
|---|---|---|
| 2,743,430 | Schultz | Apr. 24, 1956 |
| 2,866,013 | Reis | Dec. 23, 1958 |

OTHER REFERENCES

"The Photoelectricmagnetic Effect in Indium Antimonide," by C. Hilsum, D. J. Oliver and G. Rickayzen, June 10, 1955.

Journal of Electronics, vol. 1, First Series, No. 2, September 1955.